(12) United States Patent
Groarke et al.

(10) Patent No.: US 10,699,354 B2
(45) Date of Patent: Jun. 30, 2020

(54) SYSTEM AND METHOD OF ENABLING ASSET LEASING ON A TOKEN ENABLED PAYMENT CARD NETWORK

(71) Applicant: MasterCard International Incorporated, Purchase, NY (US)

(72) Inventors: Peter J. Groarke, Dublin (IE); Ahmed Hosny, Dublin (IE); Olivia Leonard, Dublin (IE); John McGuire, Co. Galway (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 259 days.

(21) Appl. No.: 15/291,617

(22) Filed: Oct. 12, 2016

(65) Prior Publication Data
US 2017/0109846 A1    Apr. 20, 2017

(30) Foreign Application Priority Data
Oct. 16, 2015 (EP) .................. 15190305

(51) Int. Cl.
*G06Q 50/16* (2012.01)
*G06Q 10/02* (2012.01)
(Continued)

(52) U.S. Cl.
CPC .......... *G06Q 50/163* (2013.01); *G06Q 10/02* (2013.01); *G06Q 20/10* (2013.01); *G06Q 20/24* (2013.01);
(Continued)

(58) Field of Classification Search
CPC ....... G06Q 50/163; G06Q 10/02; G06Q 20/36
(Continued)

(56) References Cited

U.S. PATENT DOCUMENTS

| 2003/0023552 A1* | 1/2003 | Kight ............... G06Q 20/04 705/40 |
| 2003/0036929 A1 | 2/2003 | Vaughan et al. |

(Continued)

FOREIGN PATENT DOCUMENTS

| CA | 2787060 A1 * | 7/2011 | ......... G06Q 20/3829 |
| WO | WO-2016138606 A1 * | 9/2016 | ........... G06Q 20/367 |

OTHER PUBLICATIONS

Mastercard Developers. "Masterpass DSRP and Tokenization". https://developer.mastercard.com/page/masterpass-dsrp-and-tokenization (Year: 2020).*

(Continued)

*Primary Examiner* — Shannon S Campbell
*Assistant Examiner* — Lisa Ma
(74) *Attorney, Agent, or Firm* — Buchanan Ingersoll & Rooney PC (57) ABSTRACT

Methods and systems for processing booking transactions are provided. A server received a transaction request to book an asset for a time period. The transaction request comprises a token identifier assigned to the asset and data identifying the time period. The server then identifies token data associated with the asset based on the token identifier and determines availability of the asset during the time period based on the token data. If the asset is available for the duration of the time period, the server maps the token identifier to an account identifier and sends a request to credit an account identified by the account identifier to a server of an issuer of the account.

13 Claims, 8 Drawing Sheets

(51) Int. Cl.
  *G06Q 20/10* (2012.01)
  *G06Q 20/38* (2012.01)
  *G06Q 20/24* (2012.01)
  *G06Q 20/40* (2012.01)
  *G06Q 30/06* (2012.01)

(52) U.S. Cl.
  CPC ........... *G06Q 20/385* (2013.01); *G06Q 20/40* (2013.01); *G06Q 30/0645* (2013.01)

(58) Field of Classification Search
  USPC .......................................................... 705/5
  See application file for complete search history.

(56) References Cited

U.S. PATENT DOCUMENTS

| 2007/0143207 | A1 | 6/2007 | Breen | |
| 2008/0071587 | A1* | 3/2008 | Granucci | G06Q 10/02 705/5 |
| 2014/0074724 | A1* | 3/2014 | Gordon | G06Q 20/3829 705/71 |
| 2014/0188586 | A1 | 7/2014 | Carpenter et al. | |
| 2014/0278591 | A1* | 9/2014 | Blecharczyk | G06Q 10/02 705/5 |
| 2014/0304175 | A1 | 10/2014 | Casper | |
| 2014/0372308 | A1* | 12/2014 | Sheets | G06Q 20/40 705/44 |
| 2015/0046338 | A1 | 2/2015 | Laxminarayanan et al. | |
| 2015/0193743 | A1* | 7/2015 | Simmons | G06Q 20/023 705/39 |
| 2015/0199689 | A1* | 7/2015 | Kumnick | G06Q 20/3674 705/67 |
| 2016/0092871 | A1* | 3/2016 | Gordon | H04L 63/0414 705/44 |
| 2018/0122152 | A1* | 5/2018 | Shin | G06Q 20/14 |

OTHER PUBLICATIONS

RentPayment. Rent Payment Options. http://web.archive.org/web/20150816130035/https://www.rentpayment.com/rent-payment-options/ (Year: 2015).*

Search Report dated Dec. 23, 2015, by the European Patent Office for Application No. 15190305.

* cited by examiner

SYSTEM AND METHOD OF ENABLING ASSET LEASING ON A TOKEN ENABLED PAYMENT CARD NETWORK

FIELD OF INVENTION

The present invention generally relates to a system and method for processing asset transactions, and in particular to a system and a method for enabling asset bookings.

BACKGROUND TO THE INVENTION

Rental agreements, whereby the owner of an asset agrees to allow another party temporary use of an asset in return for a payment, are commonly used on a variety of assets, such as accommodation, transport equipment and tools. In order for an asset to be rented, an agreement must be formed and a payment made between the renter and the owner of the asset. This can be arranged directly between the owner of the asset and the renter or via a third party, such as a broker. It is becoming increasingly common for such transactions to take place online via peer-to-peer marketplaces such as Airbnb™.

In existing rental procedures, the renter must come to an agreement with the asset owner or broker and must then pay the asset owner or broker. As such, all details pertaining to the asset rental are only recorded by interested parties in the transaction, and disagreements may be difficult to settle, relying on disputed facts.

Furthermore, matters become more complicated when several brokers advertise the same asset for rental. In this case, different brokers may agree to conflicting rental agreements with different potential renters. For example, a first broker may agree to rent an apartment to a first potential renter at the same time as a second broker agrees to rent the same apartment to a second renter.

In order to reduce the possibility of conflicting rental agreement, the owner of the asset may be required to communicate with a number of brokers in order to keep each broker updated with the agreements of the other brokers. This can be a time consuming and expensive process which may still lead to errors.

SUMMARY OF INVENTION

The present disclosure provides for methods and systems of processing booking transactions.

In one embodiment, a computer-implemented method of processing booking transactions is provided. The method comprises: receiving, at a server, a first transaction request to book a first asset for a first time period, the first transaction request comprising a first token identifier assigned to the first asset and data identifying the first time period; identifying first token data associated with the first asset based on the first token identifier; determining availability of the first asset during the first time period based on the first token data; and upon determining that the first asset is available for the duration of the first time period, mapping, at the server, the first token identifier to a first account identifier and sending, towards a server of an issuer of a first account identified by the first account identifier, a request to credit the first account.

The above features provide advantages over commonly used procedure for processing booking transactions. Conflicting bookings can be avoided by requiring the availability of an asset as a prerequisite for the booking payment to be processed.

In some example embodiments, the first token data further comprises calendar data, the calendar data identifying one or more time periods in which the first token data is locked.

In some example embodiments, the computer implemented method further comprises: in response to receiving a response from the issuer authorising the request to credit, updating the first token data to lock the first token data for the first time period, thereby indicating that the first asset is booked for the duration of the first time period.

In some example embodiments, the computer implemented method further comprises: determining availability of the asset during the first time period based on the first token data comprises determining whether the first token data is locked for any part of the first time period.

In some example embodiments, the first token data comprises: the first account identifier; and a first asset identifier, associated with the first asset.

In some example embodiments, the first transaction request further comprises a first renter account identifier, the first transaction request being made on behalf of a renter associated with the first renter account identifier.

In some example embodiments: the first token data further comprises details rates for different time period units; and the first transaction request comprises a first transaction amount; and the method further comprises: determining that the first transaction amount is equal to the sum of the rates for all the time period units that compose the first time period.

In some example embodiments, the computer implemented method further comprises: updating the first token data to include details of the first transaction request including the first transaction amount and the first renter account identifier.

In some example embodiments, the computer implemented method further comprises: receiving a second transaction request at the server, the second transaction request comprising a request to book the first asset for a second time period, the second transaction request further comprising the first token identifier assigned to the first asset and data identifying the second time period; identifying the first token data associated with the first asset based on the first token identifier; and determining availability of the first asset during the second time period based on the first token data.

In some example embodiments, the computer implemented method further comprises: upon determining that the first asset is available for the duration of the second time period, mapping the first token identifier to the first account identifier and sending towards the server of the issuer of the first account identifier a request to credit the first account identifier.

In some example embodiments, the computer implemented method further comprises: upon determining that the first asset is unavailable for the duration of the second time period, rejecting the transaction request.

In some example embodiments, the computer implemented method further comprises: determining that the first transaction amount is equal to the sum of the rates for all the time period units that compose the second time period; and upon determining that first transaction amount is not equal to the sum of the rates for all the time period units that compose the second time period, rejecting the second transaction request.

In some example embodiments, the computer implemented method further comprises: receiving a third transaction request at a server, the third transaction request comprising a request to book a second asset for a third time period, the third transaction request further comprising a second token identifier assigned to the second asset and data identifying the third time period; identifying second token data associated with the second asset based on the second token identifier; determining availability of the second asset during the third time period based on the second token data; and upon determining that the second asset is available for the duration of the third time period, mapping the second token identifier to a second account identifier and sending, towards a server of an issuer of the a second account identified by the second account identifier, a request to credit the second account.

In another embodiment, the present disclosure provides a system comprising at least one communication node for receiving a transaction request and a processor configured to perform the steps of any preceding claim.

BRIEF DESCRIPTION OF THE FIGURES

Embodiments of the invention will now be described, by way of example only, with reference to the accompanying drawings, in which.

DETAILED DESCRIPTION OF THE INVENTION

The present disclosure provides a method and system for processing asset transactions, such as a rental transaction.

In embodiments of the invention, a token PAN (primary account number) is generated and linked to an asset to be rented and to a payment account PAN belonging to the owner of the asset. The token PAN is not the primary account umber of a real bank account, but can be converted into a payment account PAN for an associated real bank account by the payment network provider.

During a rental transaction, the renter makes a payment required by the rental agreement using the token PAN, which identifies both the asset to be rented and recipient of the payment. The payment network provider receives the payment request, which is processed by ensuring that the transaction meets certain criteria, such as availability of the asset and sufficiency of the payment amount. The payment network provider then converts the token PAN into the linked payment account PAN and sends a request to complete the payment to the issuer bank of the payment card PAN.

The method and system of the present disclosure provide the following advantageous features for an asset owner:
  Guarantee of payment.
  The best market return on the asset.
  Ease of offering the asset for rental.
  Anonymity.
  Security.
  Ease and accuracy of calculating and paying any taxes due on the rental transaction.
  Recording details of previous rentals, e.g. as evidence of its performance.

During a rental transaction according to embodiments of the invention, the Originating Institution guarantees the payment by blocking sufficient funds from the renter's account.

In contrast, a conventional rental would go through regular money transfer channels (bank transfer or money transfer through money transfer services such as Western Union™ or MoneyGram™). The only way to guarantee such a payment is for the asset owner to receive money in advance, which leaves the renter exposed to fraud if the rented asset does not exist and is being offered for rent fraudulently.

The methods and systems disclosed herein allow multiple brokers (with or without the Asset Owner himself) to advertise an asset simultaneously—i.e. multiple sales channels vying for the Asset—thus ensuring best market return on the asset. This is possible because the booking of an asset blocks further conflicting bookings at the point of the payment network. As all bookings using the token PAN will be processed by the payment network provider, it can be ensured that no parallel bookings are made for overlapping time periods.

In contrast, during conventional rental transactions an Asset Owner must normally use a single Broker in order to prevent conflicting bookings.

The method and system of the present disclosure provide the following advantageous features for a renter:
  A booking guarantee/insurance for the renter's payment.
  Visibility of the asset in question/e.g. how popular it is/repeat visits
  Guarantee of reversal/chargeback in the event of a dispute In some embodiments of the present invention, the payment network maintains and manages the asset availability calendar centrally and, thus, ensures the asset availability at the time of payment.

Figure 1A:
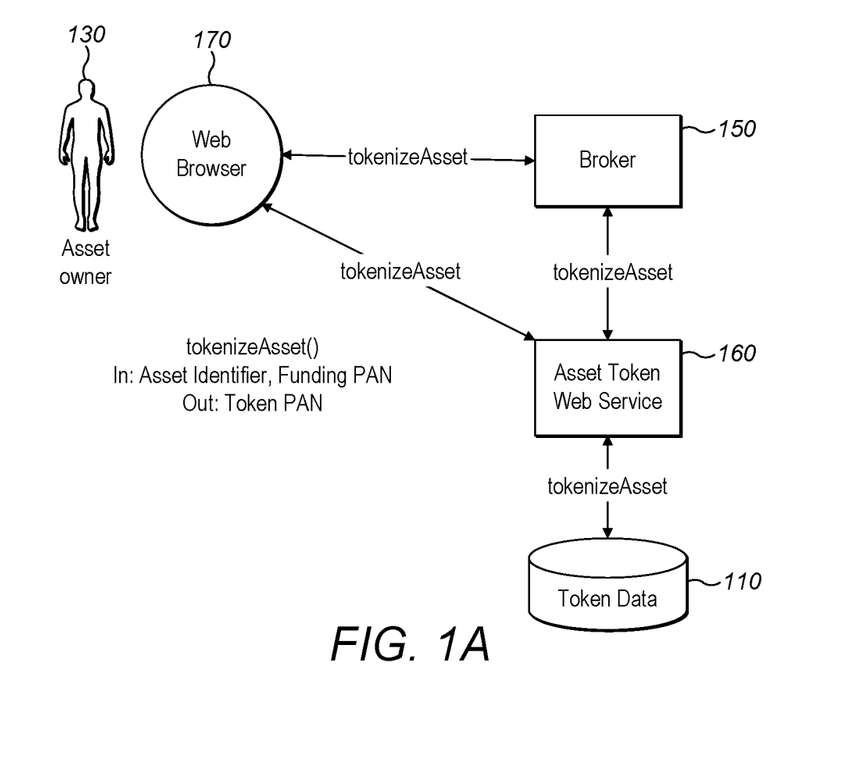
FIG. 1A shows a schematic depiction of an asset tokenization process, according to some embodiments.
Figure 1B:
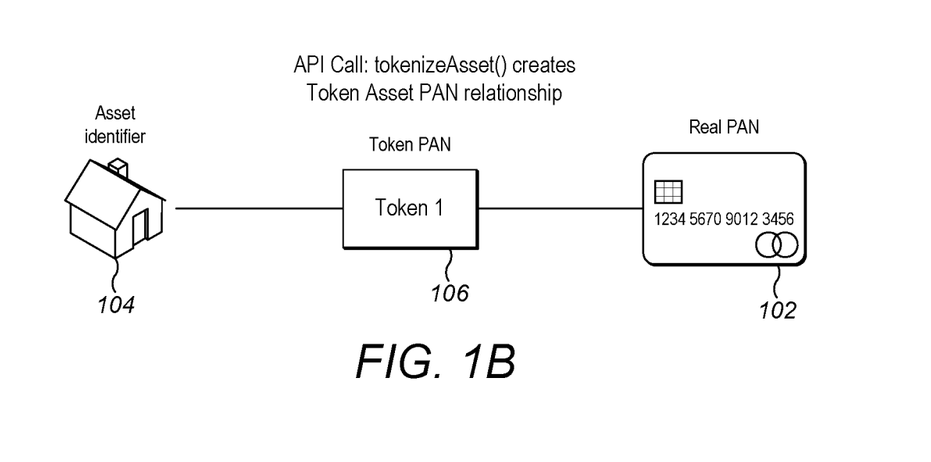
FIG. 1B shows a schematic representation of the relationship between token PAN, a PAN belonging to a real account, and an asset identifier belonging to an asset, according to some embodiments.

FIGS. 1A and B show a process for provisioning a token PAN 106 for a given asset and payment account PAN 102 and a schematic representation of the relationship between the token PAN 106, an identifier 104 of an asset, and the payment account PAN 102 associated with a payment account belonging to the owner 130 of the asset.

The asset identifier 104 may take a number of forms. For example, the asset identifier 104 may be an identifier in the Internet of Things from the asset's embedded computer system or, alternatively, a unique identifier for the class of asset, such as a registration plate number for a car or the address of a property.

In order to create a token PAN 106, the payment network provider 290 must be provided with the asset identifier 104 and the payment card PAN 102 to be linked to the token PAN 106.

In some embodiments, an asset owner 130 uses a MasterCard™ tokenize asset API to provide to an Asset Token Web Service 160, via a web browser 170, a payment card PAN 102 linked to a payment account and an asset identifier 104 linked to the asset 104 for rental.

In some embodiments of the invention, the Asset Token Web Service 160 is run by or forms part of a payment network provider. In other embodiments, the Asset Token Web Service 160 is run on behalf of a payment network provider by a third party.

The asset owner 130 may himself communicate details of the payment card PAN 102 and the asset identifier 104 directly with the Asset Token Web Service 160, or the asset owner 130 may provide the details to a broker 150 who then forwards the details to the Asset Token Web Service 170. Typically, the asset owner 130 will input the payment card PAN 102 and the asset identifier into a computing device using the interface of a web browser 170. The web browser 170 then communicates the payment card PAN 102 and the asset identifier 104 either to the Asset Token Web Service 170 or to a broker 150, If the payment card PAN 102 and the asset identifier 104 are communicated to the broker 150, the broker will then communicate this information to the Asset Token Web Service 170.

The Asset Token Web Service 160 generates a new token PAN 106 associated with the payment account PAN 102 and the asset identifier 104. Details of the token PAN 106, the payment account PAN 102 and the asset identifier 104 are stored in token data 110 that can be accessed by the payment network provider. The token PAN 106 is then returned to the asset owner 130 and/or broker 150.

In some embodiments of the invention, before generating a token PAN 106, the payment network provider 290 firsts ensures at least one or all of the following:

The asset identifier is valid (i.e. the address actually exists)

The asset is owned by the owner 130 of the account PAN 102

The account PAN 102 that is linked to the token PAN 106 provisioned on the asset is indeed associated with the owner 130 of the asset.

FIG. 1B shows a schematic representation of the relationship between the token PAN 106, an identifier 104 of an asset, and the payment account PAN 102 associated with a payment account belonging to the owner 130 of the asset. Any single token PAN 106 is linked with a single asset identifier 104 and a single payment account PAN 102. A potential renter need only understand that the token PAN 106 is associated with a certain asset and can receive payments relating to the asset, without knowing the details of the associated payment card PAN 102. The potential renter can then make a payment to the token PAN 106, which can be considered as a payment directly to the asset identified by the asset identifier 104. The payment network provider then uses the token data 110 to determine the correct recipient, i.e. the real payment account, of the payment.

A given payment account PAN 102 can be linked to a number of asset identifiers 104 using a number of token PANs 106. In this way, an owner of a number of assets are able to receive payments on a number of assets into a single payment account, with payments relating to different assets being made to different token PANs 106. From the perspective of the renter, therefore, the payments are being made to the different assets. It is only when the payment request is received by the payment network provider that the payments are redirected towards the payment accounts belonging to the asset owners.

The token PAN 106 may then be made public and can be used, as described below, during rental transactions involving the asset and the payment account PAN 102 without the asset identifier 104 and the payment account PAN 102 being made public.

The payment network provider 290 generates token data 110 identifiable using the token PAN 106, the token data 110 including the payment account PAN 102 and the asset identifier 104. The payment network provider 290 can at any time access the token data 110 to determine the payment account PAN 102 and the asset identifier 104 from the token PAN 106.

The Asset Token Web Service 160 may also use the token data 110 to store details of any transactions made using the token PAN 106 or to store information received from the asset owner 130 regarding the asset. As described in detail below, the token data 110 can then be used as criteria on which the payment network provider 290 determines whether to allow a proposed rental transaction to be completed or denied.

The token data 110 includes calendar data describing the availability of the asset during different time periods. In some embodiments of the invention, the calendar data is segmented into a number of individual time units, such as days or hours, each time unit having a status. The status of a time unit can be:

BLOCKED: The owner decided to block a time period (calendar entry).

INTENTION: Intention booking for the time period (calendar entry).

BOOKED: A booking is made with an associated PAN for the time period (calendar entry).

In some embodiments of the invention, the calendar data also includes cost data relating to the cost of booking the asset. In some embodiments of the invention, the cost data may include a minimum daily/hourly rate required to book the asset. The minimum daily/hourly rate may be different in different time units. The cost data may further include details of discounts to be provided on booking for certain time periods. For example, the discount might be 20% for more than 3 days, or 30% for more than a week, etc.

The token data 110 comprises details of some or all past transactions performed using the token PAN 106. The token data 110 may also be updated by the asset owner 130 (for example, by using a designated application enabling the asset owner to access the token data 110) to record expenditure, such as maintenance costs, on the asset. The token PAN 106 can also be used to make payments from the payment account associated with the token PAN. Outgoing transactions may also be recorded in the token data 110. An advantage of building a record of incoming and outgoing expenditure associated with the asset is that the owner can generate an accurate account of the performance of the asset in rental.

Rental transactions can be conducted by potential renters 250 of the token-linked asset by making a payment to the token PAN 106. The payment network provider 290 ensures that the payment of the renter fulfils a number of criteria before allowing the payment to be completed. In some embodiments, these criteria include the asset being available during a period specified by a renter and the amount of money being sent in the transaction being sufficient for the terms of the rental.

Figure 2:
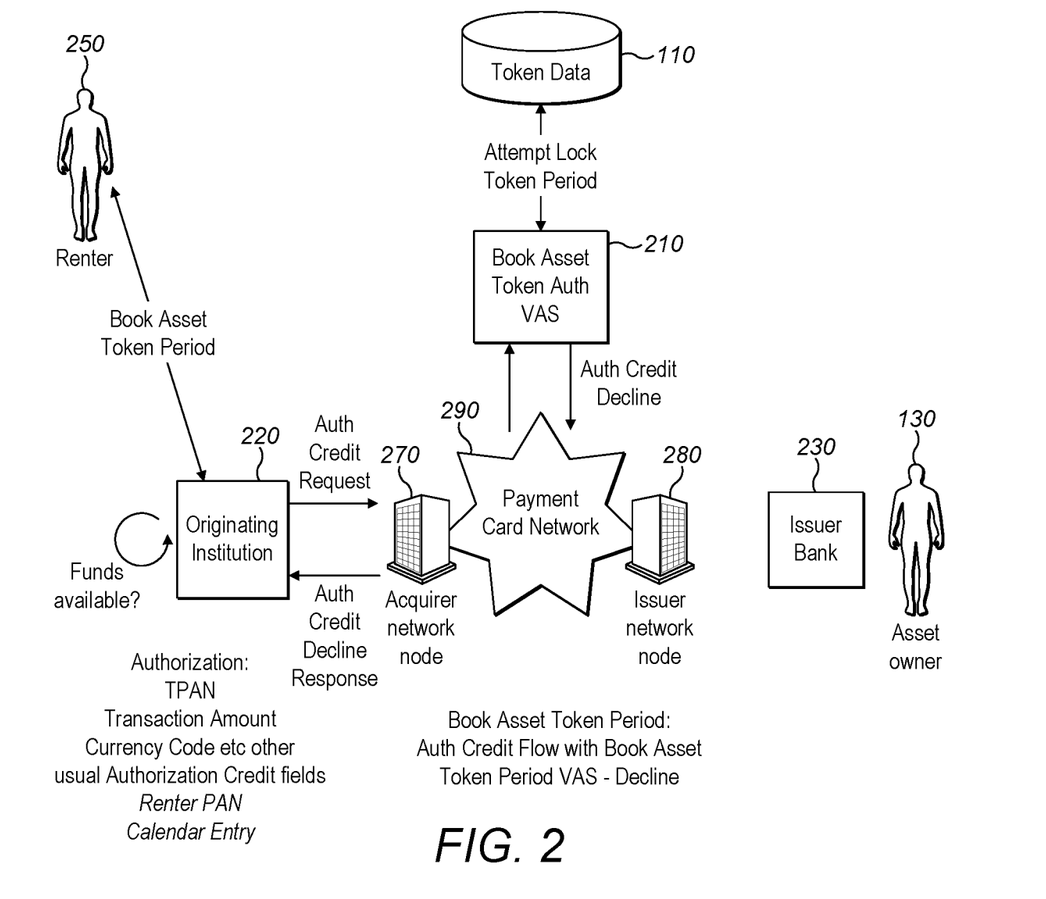
FIG. 2 shows a flow diagram of a process according to a failed booking transaction, according to some embodiments.

FIG. 2 shows a flow diagram of a process involving a transaction that is blocked by the payment network provider 290 and, thus, fails.

A renter 250 initiates a payment from an account at the renter's Originating Institution 220. The initiation of the payment will be from a channel supported by the Originating Institution 220 that supports a P2P (person to person) payment program, such as the MasterCard™ MoneySend™ program. The renter/broker provide a number of fields, including the token PAN associated with the asset to be rented, the amount of money to be transferred, the renter PAN associated with the renter's payment account at the Originating Institution 220, the calendar dates corresponding to the dates for which the asset is to be rented, and standard authorization credit fields such as currency code etc.

If the Originating Institution 220 determines that the renter's account has sufficient funds to transfer the specified payment amount, the Originating Institution 220 sends a authorization credit request (such as an ISO8583 Authorization Credit or another such transaction request) to an acquirer network node 270 (or other suitable communication node) of the payment card network 290. The authorization credit request includes the information entered when initiating the transaction, such as the renter PAN and calendar dates for which the asset is to be rented.

Upon receiving the authorization credit request, the acquirer network node 270 extracts the token PAN 106 (which in some embodiments corresponds to DE2 of the ISO8583 Authorization Credit) and determines the PAN Range from the PAN (as described in more detail with reference to FIG. 4). In some embodiments, PAN Range comprises the leading 6 or 8 digits of the PAN. The acquirer network node then determines whether this PAN Range has an associated Authorization Value Added Service, such as the MasterCard InControl™ API, or not.

If the PAN in question is found to be associated with the necessary Asset Authorization Value Added Service, the authorization takes a detour (triangular routing) to the Book Asset Token Authorization Value Added Service (VAS) 210.

The Book Asset Token Authorization Value Added Service (VAS) 210 sets a number of controls on whether an authorization credit request may be approved for forwarding to the Issuer Bank 230 of the asset owner or declined. In order to determine whether to approve or decline the authorization credit request, the Book Asset Token Authorization Value Added Service (VAS) 210 compares data in the authorization credit request with the token data 110 according to predetermined criteria.

The Book Asset Token Authorization Value Added Service (VAS) 210 will decline a credit authorization request if the asset is unavailable for any of the period in which the renter has attempted to book the asset. In some embodiments of the invention, the Book Asset Token Authorization Value Added Service (VAS) 210 will also decline a credit authorization request if the payment amount is below a minimum specified amount required for the booking.

By including a control to the asset which rejects transactions below a certain limit, the owner 130 can open up his asset for multiple agencies while maintaining control over provided discounts and ensuring appropriate level of income.

Figure 4:
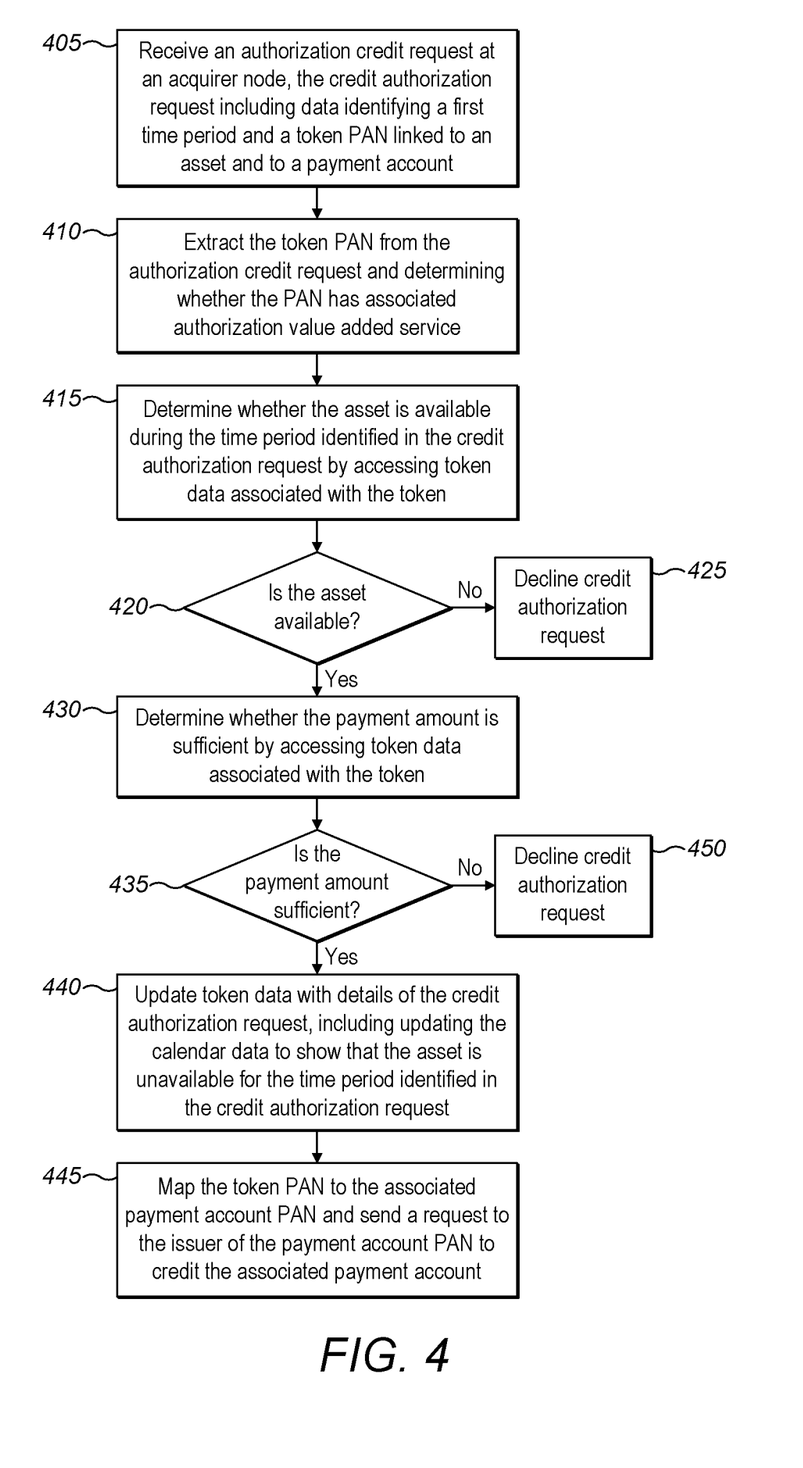
FIG. 4 shows a flow diagram of a process according to exemplary embodiments of the present invention.

The processes by which the Authorization Value Added Service (VAS) 210 determines whether to decline a credit authorization request are described in more detail with respect to FIG. 4.

In the event that the credit authorization request is declined, the payment network provider will return an authorization credit decline response to the originating institution 220 of the renter 250 via the acquirer network node 270.

Figure 3:
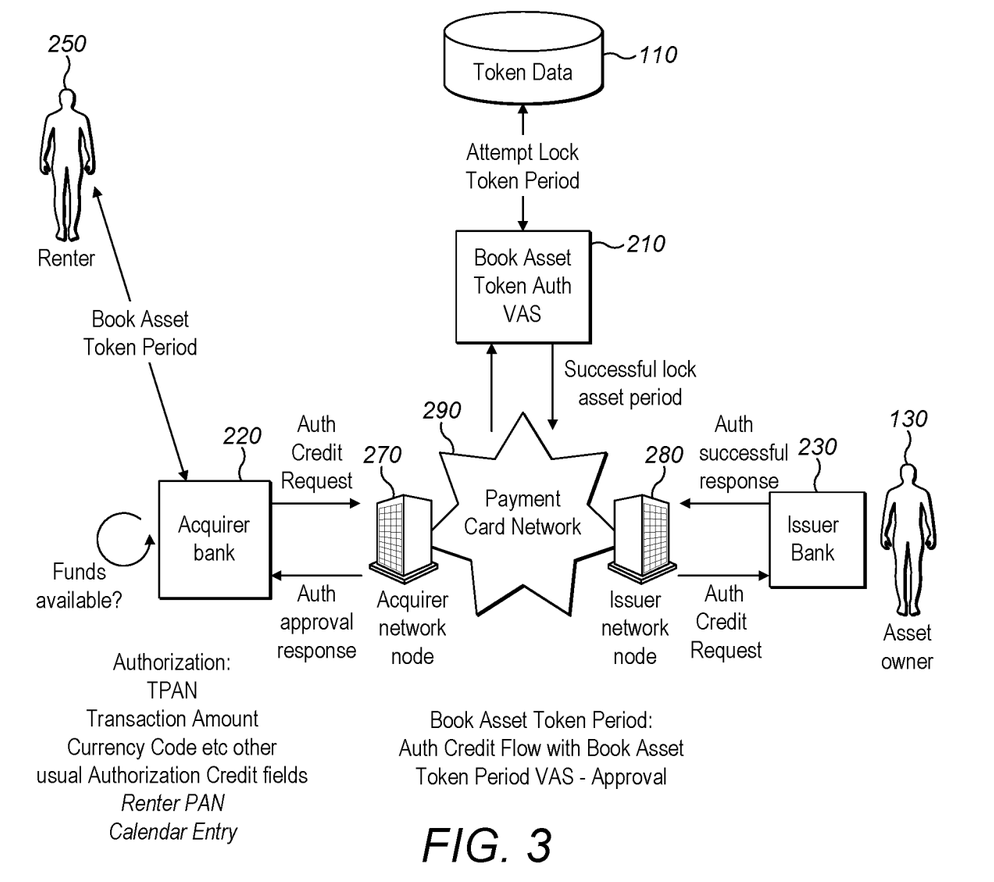
FIG. 3 shows a flow diagram of a process according to a successful booking transaction, according to some embodiments.

FIG. 3 shows a flow diagram including steps in a successful payment transaction that processed by the payment network provider 290.

This process is initially the same as that described with reference to FIG. 2. If the Book Asset Token Authorization Value Added Service (VAS) 210 determines that the credit authorization request meets the requirements of the controls placed on the token (for example, the asset being available and the payment being sufficient for the rental), token data 110 will be updated to indicate that the asset is now booked for the time period specified by the authorization credit request. The token data 110 can also be updated to include further details of the transaction, such as the amount of the payment involved, the identity of renter, broker ratings, insurance information, and information relating to the owner or renter of the asset (e.g. driving licence information when renting a car or legal documents relating to the usage of the asset if required by law).

The payment network provider 290 then maps the token PAN 106 onto the associated payment account PAN 102. The credit authorization request is then sent from an issuer network node 280 (or other suitable communication node) of the payment network provider 290 to the issuer bank 230 of the payment account PAN 102. An authorization successful response is returned by the issuer bank 230 to the issuer network node 280 of the payment network provider 290. The payment network provider 290 then sends an authorization approval response from the acquirer network node 270 to the originating institution 220.

FIG. 4 shows a flow diagram describing processes executed by the payment network provider 290 in accordance with some embodiments of the present invention.

In the context of FIG. 4 the following steps are computer-implemented at the point of the payment network provider 290. However, other entities may be employed to perform some of the steps. For example, a third party acting on behalf of or in cooperation with the payment network provider 290.

In step 405, the acquirer node 270 receives an authorization credit request sent from the Originating Institution 220 of a payment account belonging to the potential renter 250. The authorization credit request comprises data identifying a time period for which a potential renter 250 intends to rent an asset and token PAN 106 associated with both an asset identifier 104 and a payment card PAN 102 belonging to the owner 130 of the asset (as described with reference to FIG. 1).

In step 410, the token PAN 106 is extracted from the authorization credit request and the MasterCard™ systems determine whether the PAN has an associated Authorization Value Added Service. For example, the first 6 or 8 digits of the PAN may indicate whether the PAN has an associated Authorization Value Added Service 210. In such a scenario, the first 6 digits 500000 could indicate that the PAN does have an associated Authorization Value Added Service 210, whereas the first 6 digits 500001 could indicate that the PAN does not have an associated Authorization Value Added Service 210. In this case, a PAN in the range 5000000000000000-5000009999999999 would be determined to have an associated Authorization Value Added Service 210, whereas a PAN in the range 5000010000000000-5000019999999999 an associated Authorization Value Added Service 210.

If it is PAN has an associated Authorization Value Added Service 210, the authorization credit request is subjected to further controls to determine whether the payment should be accepted.

In steps 415 and 420, the Authorization Value Added Service 210 determines whether the asset is available during the time period identified in the credit authorization request. In some embodiments, this is done by comparing token data 110 associated with the token PAN 106 with data in the authorization credit request.

In some embodiments, the Authorization Value Added Service 210 determines whether the asset is available by accessing the calendar data of the token data 110 associated with the token PAN 106 and determining whether the any of the time period identified in the credit authorization response is unavailable. This may be done, for example, by determining whether any of the time units within the time period identified in the credit authorization response has a status of BOOKED, INTENTION or BLOCKED. If none of the time units within the time period identified in the credit authorization response is unavailable, the asset is considered to be available.

If any of the time units has a status of BOOKED, INTENTION, or BLOCKED, a response is sent back to the Originating Institution 220 indicating that the credit authorization request is declined and the process is terminated, as shown in step 425.

If the asset is determined to be available during the time period identified in the credit authorization request, the process proceeds to step 430.

In step 430 and 435, the Authorization Value Added Service 210 determines whether the payment amount is sufficient for the transaction to be approved. In some embodiments, this is done by comparing the token data 110 associated with the token PAN 106 with data in the authorization credit request.

In some embodiments, the Authorization Value Added Service 210 determines whether the payment amount is sufficient for the transaction to be approved by accessing the token data 110 associated with the token PAN 106 and determining from the token data 110 whether the payment amount specified in the authorization credit request is at least equal to the sum of the minimum rates required for all the time units that make up the time period specified by the authorization credit request.

In some embodiments, there are multiple authorizations for the asset to complete the full booking (an initial deposit followed by some installments). Each of them will have the full amount for the full time period (and this amount is what will be used for applying the control). The full amount will be in a different field to the transferred amounts (i.e., DE4, DE6). The different transactions related to the booking will be tracked (Using either a unique booking ID that the renter generates on the first authorization or using the renter's PAN along with the time periods). The final paid amount for the booking will be available for the owner 130 later along with the history of the payments. The owner 130 can use this information to determine the broker's efficiency.

If Authorization Value Added Service determines that the payment amount specified in the authorization credit request is insufficient, the payment authorization declined and the process is terminated, as shown in step 450.

If Authorization Value Added Service 210 determines the payment amount payment amount specified in the credit authorization request is correct, the process proceeds to step 440.

In step 440, the Authorization Value Added Service 210 updates the token data 110 to indicate that the asset is booked for the duration of the time period identified in the credit authorization response. This may be done, for example, by updating the status of all the time units in the time period identified in the credit authorization response to BOOKED.

In step 445, the token PAN is mapped to the associated payment account PAN. In some embodiments, the payment account PAN is stored in the token data 110 associated with the token PAN. The network service provider then sends to the issuer of the payment account PAN a request to credit the payment account.

Figure 5:
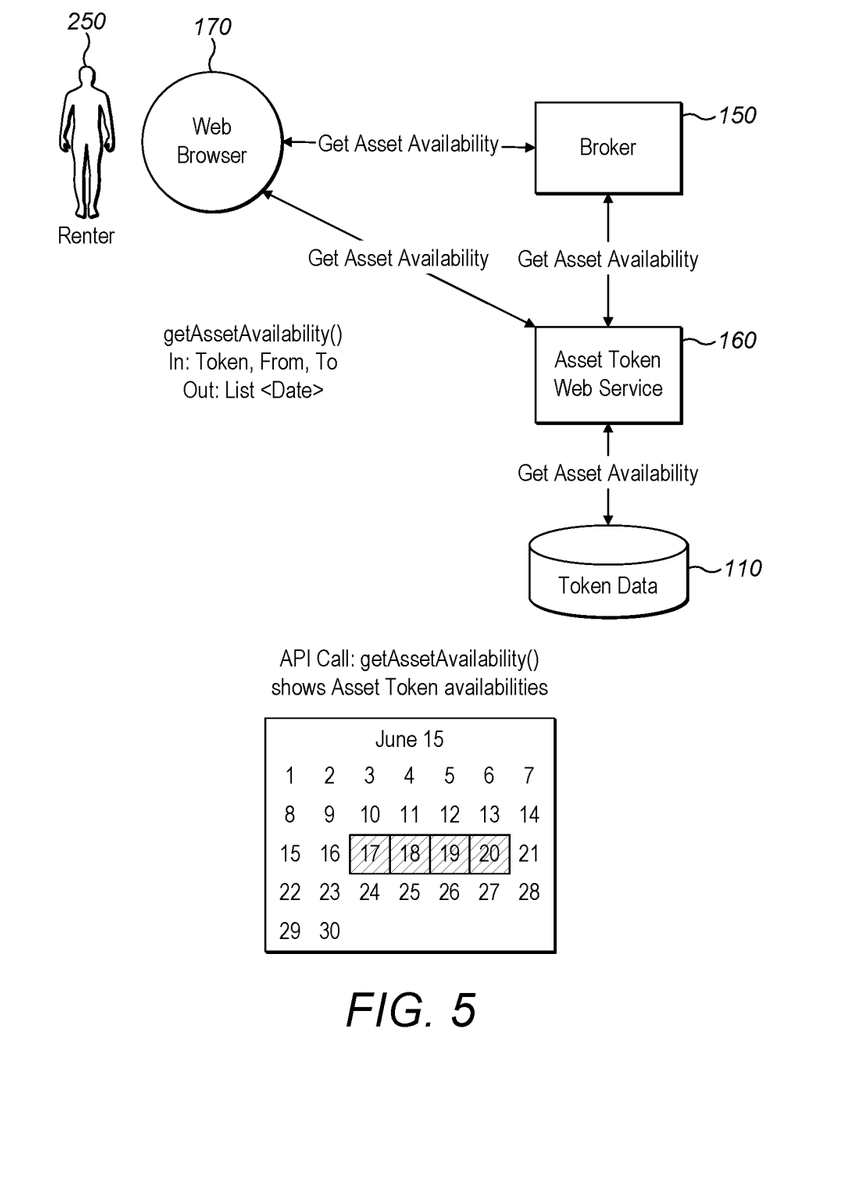
FIG. 5 shows a schematic depiction of a token availability determining process, according to some embodiments.

FIG. 5 shows a schematic depiction of a token availability determining process.

One advantageous feature of the disclosed system arrangement is the centralized automatic updating of token data 110 relating to the availability of an asset. This allows numerous brokers to simultaneously offer an asset for rental without requiring the exchange of constant up to date information regarding the availability of the asset.

A Get Asset Availability API is used by potential renters 250 and brokers 150 to determine the availability of an asset between certain dates. The potential renter 250 or broker 150 uses a web browser 170 to input a token PAN 106 corresponding to the asset for which the availability is sought.

The potential renter 250 or broker 150 also inputs two dates (a start date and an end date) which form the bounds of a date range. The Get Asset Availability API accesses the calendar data of the token data 110 and retrieves a list of all the time units within the date range that are available. For example, if the time units for the asset are days, the Get Asset Availability API will retrieve a list of days in which the asset is available.

The Get Asset Availability API then returns the list of time units in which the asset is available to the broker 150 or to the potential renter 250.

Figure 6:
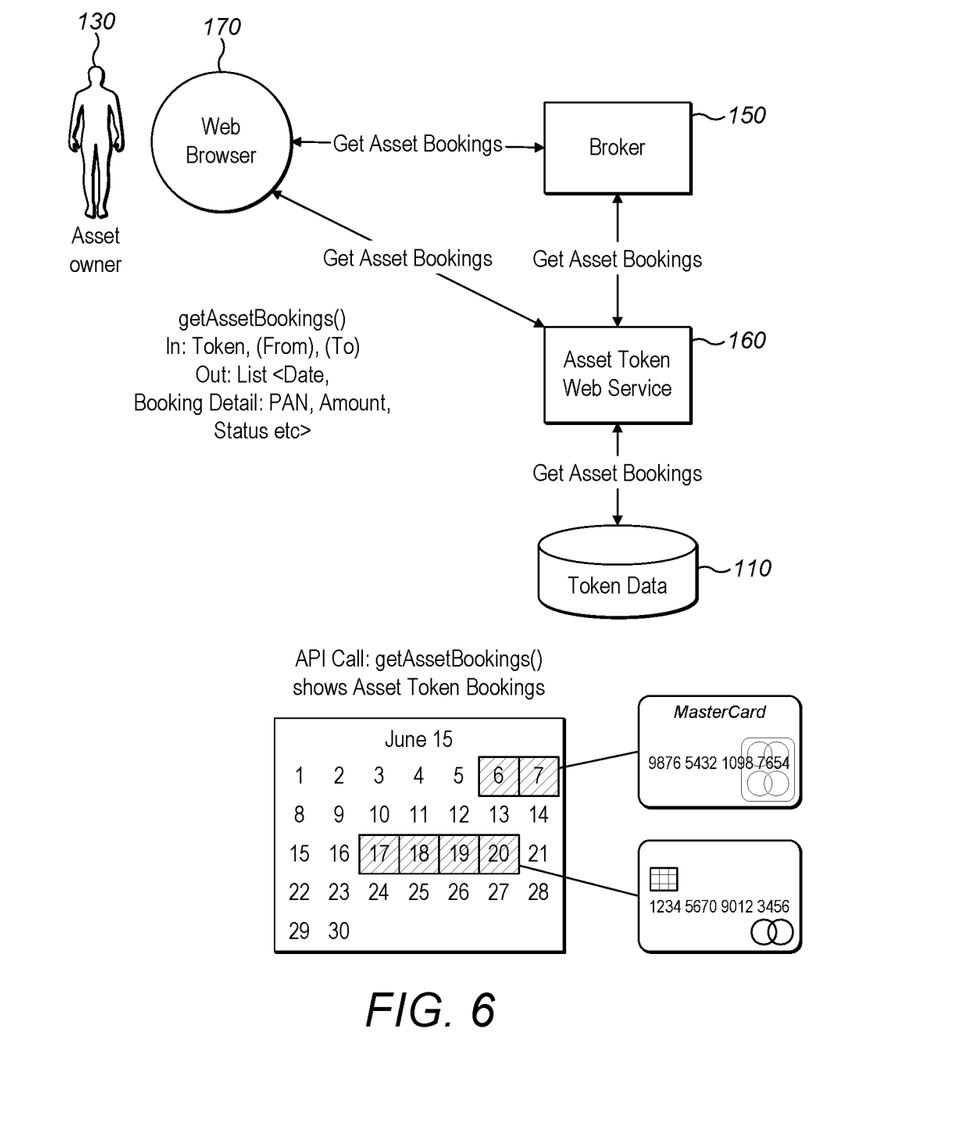
FIG. 6 shows a schematic diagram of a process for determining when the token is locked, according to some embodiments.

FIG. 6 show a schematic depiction of a process for retrieving a list of bookings made for the asset between certain dates. This feature allows the data collected during the tokenized payment process to be used by a number of parties to provide an account of the bookings that have been made on the asset.

The Get Asset Bookings API can be used by the asset owner 130 or his issuer bank for internal information. It will hide the payment card PANs as a part of PCI compliance and may just provide references to them.

The asset owner 130 or the issuer bank uses a web browser to input a token PAN 106 corresponding to the asset for which the list of bookings is sought.

The asset owner 130 or the issuer bank also inputs a two dates (a start date and an end date) which form the bounds of a date range. The Get Asset Bookings API accesses the calendar data of the token data 110 and retrieves a list of all the time units within the date range that have been booked. In some embodiments, the Get Asset Bookings API may also retrieve details of the payment amount included in the bookings and the payment card PAN used to make the bookings.

The Get Asset Bookings API then returns the list of time units in which the asset is booked. The Get Asset Bookings API may also return details of the payment amounts and the payment card PAN used in the booking.

A different API, GetPANAssetBookings can be provided to a broker which, with consent of the PAN owner, can return the bookings history for that specific PAN on that asset for a single broker or through multiple brokers depending on the brokers setup.

Figure 7:
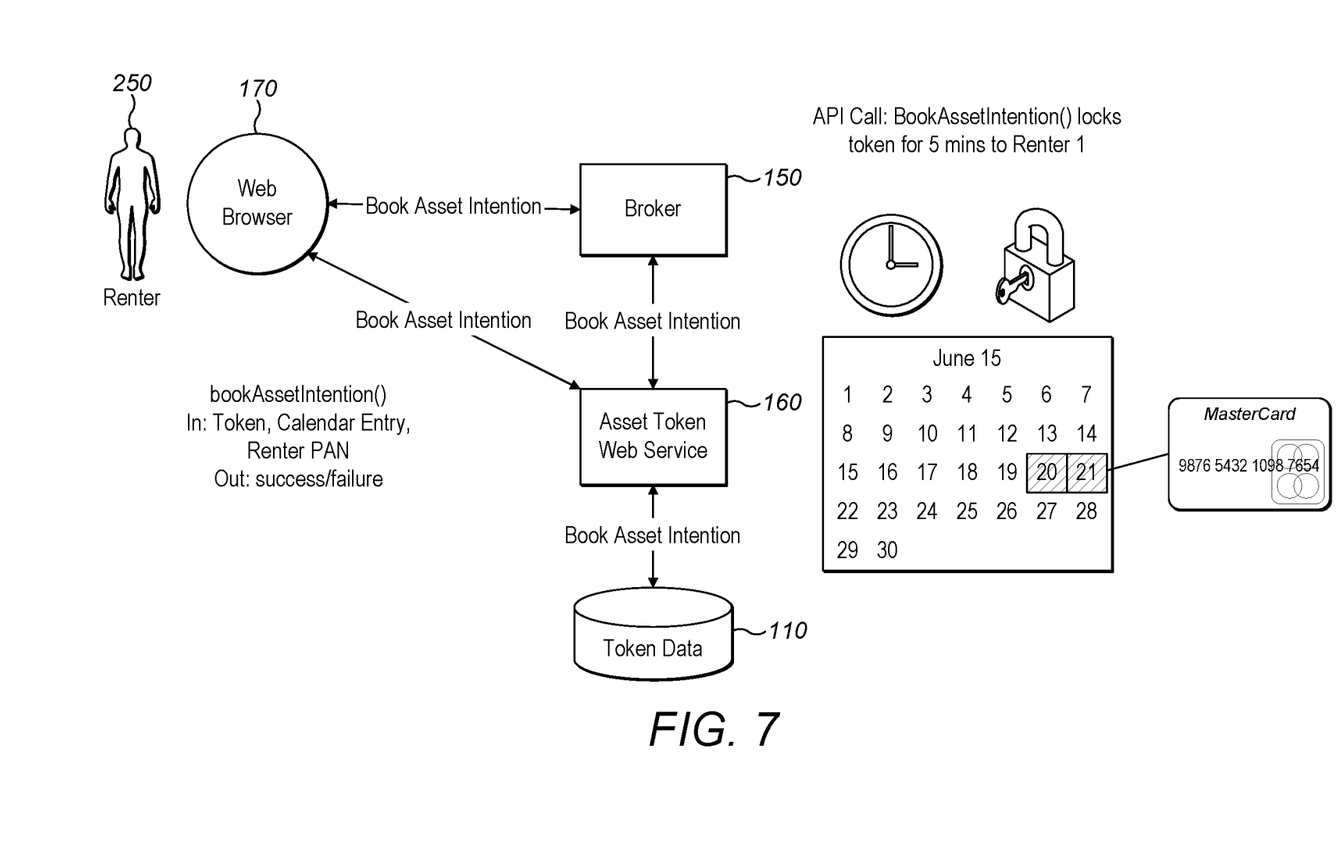
FIG. 7 shows a schematic diagram of a temporary token locking process, according to some embodiments.

FIG. 7 shows a Book Asset Intention API, which can be used to prevent an asset being booked by another party while a potential renter 250 or broker 150 is initiating the process of booking the asset.

Before completing a booking of a tokenized asset, a potential renter 250 or broker 150 may temporarily update the token data 110 to make a time period for which they intend to make a booking unavailable in order prevent another user from booking the asset.

The potential renter 250, the broker 150 or the asset owner 130 uses a web browser 170 to input a token PAN 106 corresponding to the asset for which the list of bookings is sought.

The Book Asset Intention API is also input with the renter's payment account PAN and calendar entries defining the time period for which the potential renter or broker intends to make a booking for the asset.

The Book Asset Intention API then accesses the token data 110 and updates the calendar entries for the time period for which the potential renter or broker intends to make a booking for the asset to temporarily show the status of INTENTION.

If another potential renter attempts to make a payment for a booking on the asset for the a time period including the dates marked as INTENTION, the payment network provider will decline the payment in accordance with steps 415, 420 and 425 of the process described with reference to FIG. 4.

The status remains as INTENTION either until the asset is successfully booked, at which point the status is updated to BOOKED, or until a time period has elapsed in which the potential renter or broker may reasonably have completed the booking, at which point the status is removed and the asset becomes available. The time period after which the INTENTION status is removed in the absence of a booking is usually pre-set and, although adjustable, may be, for example, 5 minutes.

Figure 8:
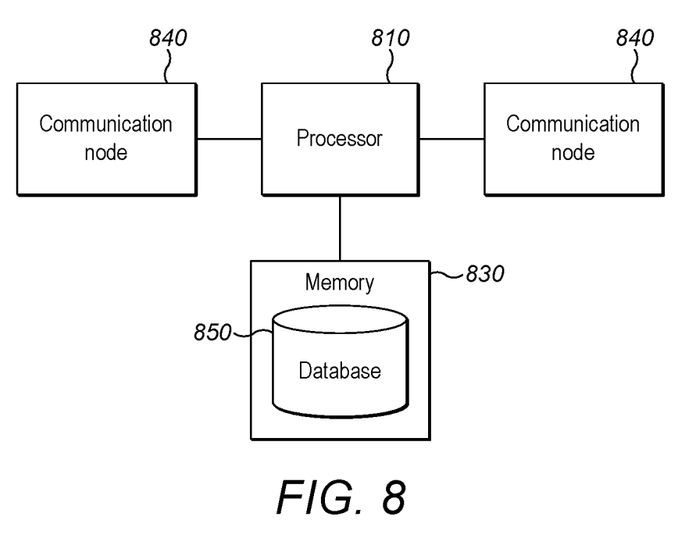
FIG. 8 shows a schematic diagram of a system configured to perform some embodiments of the disclosed invention.

FIG. 8 shows a schematic diagram of a computer system 800 that may be operated by a payment network provider to perform the steps of some embodiments of the present invention.

The computer system 800 may be conventional in its hardware aspects but may be controlled by software to cause it to operate in accordance with aspects of the present invention.

The computer system 800 may include a computer processor 810 operatively coupled to a number of communication nodes, and a storage device 830.

The communication nodes 840 may comprise an acquirer network node for receiving an authorization credit request from an Originating Institution and an Issuer network node for sending a credit request to an Issuer Bank.

The computer processor 810 may comprise by one or more conventional processors. Processor 810 operates to execute processor-executable steps, contained in program instructions so as to control the computer system 800 to provide desired functionality.

Storage device 830 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 830 stores one or more programs for controlling processor 810. The programs comprise program instructions that contain processor-executable process steps of computer system 800, including, in some cases, process steps that constitute processes provided in accordance with principles of the present invention.

The storage device 830 also stores a database 850 suitable for storing token data associated with a token PAN. The data may comprise calendar entries, text notes on an asset, financial data relating to the asset and details of the payment account PAN associated with the token PAN and details of the asset identifier associated with the token PAN.

It will be understood by the skilled person that the order of steps described above is not fixed and the scope of the invention encompasses processes in which more or fewer steps are executed than those explicitly described above.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A computer-implemented method of processing booking transactions, the method comprising:

storing, in a storage device, of a server of a payment network, as first token data, a first token primary account number (PAN) together with a first asset identifier, and a first real payment account number (PAN) of an owner of the first asset, wherein (i) the token PAN is not an account number of a real bank account, and (ii) the first token PAN is linked to the first asset identifier and the first real PAN;

receiving, at the server of the payment network, from an originating financial institution of a payment account belonging to a consumer, via an acquirer network node, a first transaction request for the consumer to book the first asset for a first time period, the first transaction request comprising the first token PAN and data identifying the first time period, wherein the first transaction request is formatted based on an International Organization of Standardizations (ISO) 8583 standard;

identifying, in the storage device, by the server, based on the first token PAN included in the received first transaction request, the first token data associated with the first asset based on the first token PAN, said first token data including the first asset identifier and the first real PAN linked to the first token PAN;

determining, by the server, availability of the first asset during the first time period based on the first token data; and upon determining that the first asset is available for a duration of the first time period,
  mapping the first token PAN to the first real PAN of the owner of the first asset, and
  transmitting, towards a server of an issuer of the first real PAN of the owner, a request to credit a first payment account associated with the first real PAN.

2. The method according to claim 1, wherein:
the first token data further comprises calendar data, the calendar data identifying one or more time periods in which the first token data is locked.

3. The method according to claim 2, further comprising:
in response to receiving a response from the issuer authorising the request to credit, updating the first token data to lock the first token data for the first time period, thereby indicating that the first asset is booked for the duration of the first time period.

4. The method according to claim 1, wherein:
determining availability of the first asset during the first time period based on the first token data comprises determining whether the first token data is locked for any part of the first time period.

5. The method according to claim 1, wherein:
the first transaction request further comprises a first renter account identifier, the first transaction request being made on behalf of a renter associated with the first renter account identifier.

6. The method according to claim 1, wherein:
the first token data further comprises rates for different time period units; and
the first transaction request comprises a first transaction amount;
and the method further comprises:
determining that the first transaction amount is equal to a sum of the rates for all the time period units that compose the first time period.

7. The method according to claim 6, further comprising:
updating the first token data to include details of the first transaction request including the first transaction amount and the first renter account identifier.

8. The method according to claim 1, further comprising:
receiving a second transaction request at the server, the second transaction request comprising a request to book the first asset for a second time period, the second transaction request further comprising the first token PAN assigned to the first asset and data identifying the second time period;
identifying the first token data associated with the first asset based on the first token PAN; and
determining availability of the first asset during the second time period based on the first token data.

9. The method according to claim 8, further comprising:
upon determining that the first asset is available for the duration of the second time period,
mapping the first token PAN to the first real PAN and sending towards the server of the issuer of the first real PAN a request to credit the first payment account.

10. The method according to claim 8, further comprising:
upon determining that the first asset is unavailable for the duration of the second time period,
rejecting the transaction request.

11. The method according to claim 8, further comprising:
determining that the first transaction amount is equal to a sum of individual rates for each time period unit that composes the second time period; and
upon determining that first transaction amount is not equal to the sum of the individual rates for each time period unit that composes the second time period, rejecting the second transaction request.

12. The method according to claim 1, further comprising:
receiving a third transaction request at the server, the third transaction request comprising a request to book a second asset for a third time period, the third transaction request further comprising a second PAN assigned to the second asset and data identifying the third time period;
identifying second token data associated with the second asset based on the second token PAN;
determining availability of the second asset during the third time period based on the second token data; and
upon determining that the second asset is available for the duration of the third time period,
mapping the second token identifier to a second real PAN and sending, towards a server of an issuer of the second real PAN, a request to credit a second payment account associated with the second real PAN.

13. A system comprising at least one communication node for receiving a transaction request and a processor configured to perform the steps of to claim 1.

* * * * *